June 4, 1957  W. C. SHAW ET AL  2,794,884
CIRCUIT BREAKER
Filed Oct. 24, 1955
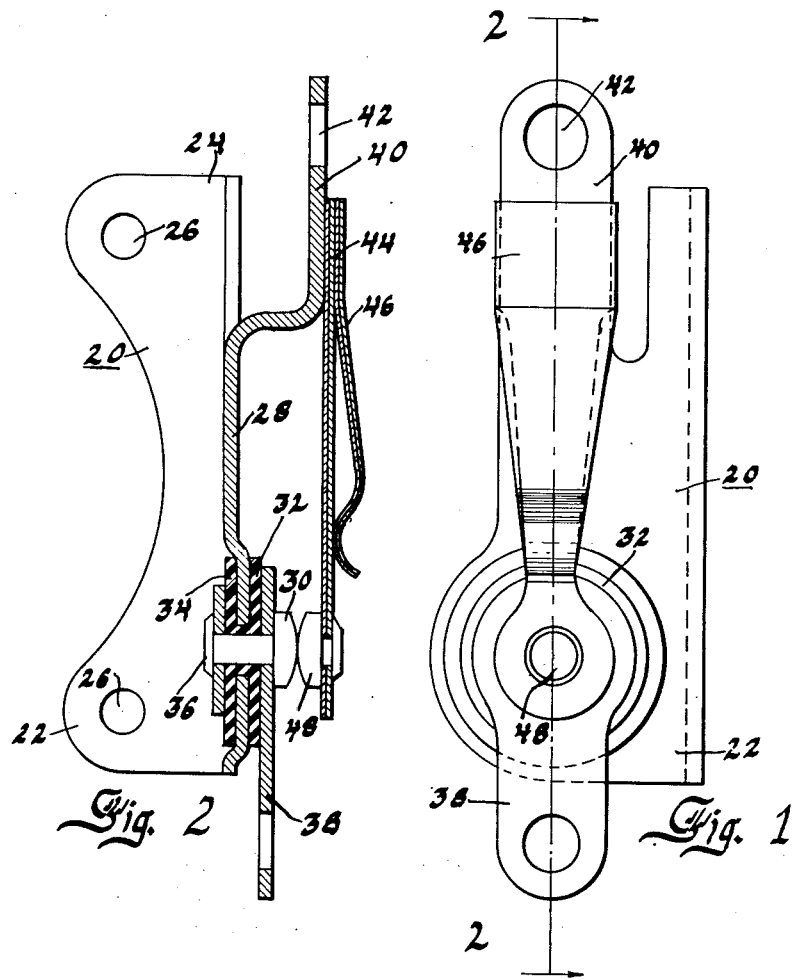
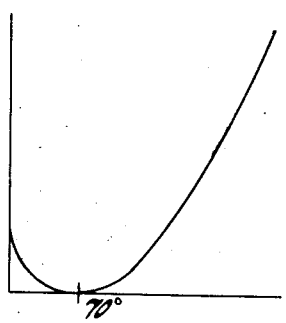
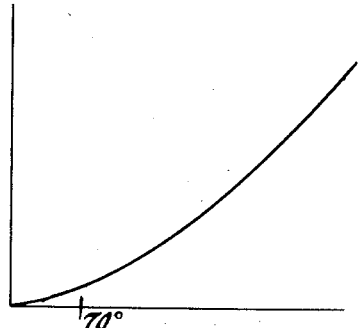
INVENTOR.
Willard C. Shaw
BY Harold V. Elliott
John T. Marvin
THEIR ATTORNEY

# United States Patent Office 2,794,884
Patented June 4, 1957

2,794,884
CIRCUIT BREAKER

Willard C. Shaw and Harold V. Elliott, Anderson, Ind., assignors to General Motors Corporation, Detroit, Mich., a corporation of Delaware Application October 24, 1955, Serial No. 542,371

7 Claims. (Cl. 200—138)

This invention relates to electric switches and more particularly to temperature responsive switches of the bimetallic type.

The present invention is concerned with a switch that is responsive to current and ambient temperature changes and is adapted to serve as an overload and protective device. The switch contemplates an arrangement of parts so that the switch parts may be subjected to a wide range of temperature variations without a loss of calibration. This type of switch is particularly suited for use in motor vehicles, and, when so used, will maintain its calibration in spite of vibrations due to road shock and the wide range of temperature variations that accompany the normal vehicle operation.

It is well known that switches normally tend to have their calibration upset when severe variations in temperature occur. This fact is particularly noticeable in bimetallic switches as the extreme stresses which are imposed on the bimetal thermostatic members when the switch is subjected to a wide range of temperature variations, frequently cause the bimetallic members to become prestressed, particularly during the periods when the temperature of the switch is decreased to an abnormal value. This prestressing of the parts will cause the calibration of the switch to be upset and will destroy the usefulness of the switch as an overload protector. The switch, according to the present invention, is adapted to serve as a motor protector under wide variations in temperature and will operate under these conditions without loss of calibration.

An object of the present invention is to provide a compensating bimetallic element in a thermostatic switch which cooperates with the remaining parts of the switch to maintain a substantially constant pressure between the switch contacts when the temperatures of the switch parts are decreased below a predetermined value.

Another object of the present invention is to provide a switch with a pair of bimetallic elements, both of which are thermally responsive to either current passing therethrough or ambient temperature conditions and one of which opens and closes a pair of contacts upon deviation of the temperature and/or current from a predetermined value and the other of which is arranged to urge the first bimetal element to close said contacts at the predetermined temperature and to compensate for the increased pressure exerted by the first bimetal element when the temperature is lowered from said predetermined value.

A further object of the present invention is to incorporate a single curve and a double curve bimetal element in a switch to provide a fast break between the switch contacts on a rise in temperature and a constant pressure between the contacts when the temperature of the bimetal falls below a predetermined value.

Further objects and advantages of the present invention will be apparent from the following description, reference being had to the accompanying drawings wherein preferred embodiments of the present invention are clearly shown.

In the drawings:

Figure 1 is a top plan view of the switch according to the present invention.

Figure 2 is a side view, partly in section, along line 2—2 in Figure 1.

Figure 3 is a temperature deflection curve showing the characteristics of one of the bimetals of the switch in Figure 1.

Figure 4 is a temperature deflection curve showing the characteristics of another bimetal as used in the switch in Figure 1.

In the drawings, the switch 20 has a support 22 formed as shown to have a mounting portion 24 apertured at 26 to permit the switch to be mounted in some suitable location on a support, not shown. The support 22 is provided with an angled portion 28 formed to support a stationary contact 30 and which is suitably insulated from portion 28 by insulators 32 and 34. The stationary contact, in the embodiment shown, is preferably secured to the portion 28 by peening over one of its ends 36 so that a terminal 38 is securely held in position relative to the head of the contact 30. The portion 28 also includes a bent ear portion 40 which is suitably apertured at 42 to provide a second terminal portion for the switch. The ear portion 40 also provides a support for a pair of bimetal elements 44 and 46 which are suitably secured thereto as by welding. The bimetal element 44, as shown, has one end fixed to the portion 40 and has a movable contact 48 secured on its free end which is adapted to engage the stationary contact 30. The bimetallic element 46 also has one end secured to portion 40 and has its free end positioned relative to the bimetal element 44 and contact 30 as shown in Figure 2. This bimetal element is curved as shown and is prestressed to urge the contacts 30 and 48 into engagement with each other when the switch parts are at a predetermined temperature which constitutes the calibration temperature for the switch. At this point, it is to be noted that the bimetal element 44 is secured to the ear 40 and is unstressed at the calibration temperature. Thus, the only element which normally causes the engagement between the contacts 48 and 30 is the bimetal 46.

In Figure 3 of the drawings, the temperature deflection curve of the bimetal element 44 is shown. It will be noted from this curve that the characteristics of this bimetal are such that it follows a single curve. This means that the amount of deflection occurring in the bimetal will vary directly with the change in temperature. In Figure 4 of the drawings, the temperature deflection curve of the bimetal 46 is shown. It will be noted that this bimetal is selected and formed to have a double curve characteristic, that is to say, the bimetal above a predetermined temperature will have a deflection which varies directly with the increased temperature, and below a predetermined temperature the bimetal will have a deflection which varies directly with the decrease in temperature. The materials selected for the bimetal 46 form no part of the present invention and may be selected to provide any predetermined characteristics at any predetermined temperature in accordance with the disclosure set forth in the patent to Waltenberg 2,315,565.

When the two bimetal elements 44 and 46 are positioned as shown in Figure 2 and element 44 is secured to ear 40 without stress and element 46 is secured to ear 40 under stress at some predetermined temperature, i. e., 70°, it has been found that as the temperature is increased above 70°, the deflection of the bimetal elements 44 and 46 is such that they will tend to move in the same direction, i. e., to the right in Figure 2 so that the engagement between contacts 48 and 30 will be broken with a rapid break. When, however, the temperature of the bimetals 44 and 46 falls beneath the predetermined value of 70°, the bimetal element 44 will tend to increase the pressure between contacts 30 and 48 while the bimetal 46, because of its double curve characteristic and the prestress applied thereon, will tend to decrease the pressure between the contacts and compensate for the action of the bimetal 44. Thus, it is clear that the pressure between the contacts will remain substantially constant as the temperature is decreased from a predetermined value.

It is to be noted that the bimetal elements 44 and 46 are secured to ear 40 which constitutes a portion of one of the terminals of the switch. Thus, when the switch is placed in service, and the contacts are closed, current will pass from the ear 40 through both of the bimetal elements 44 and 46 to contact 48 which, because of its engagement with contact 30, will permit the current to pass to terminal 38. When the current through the bimetal elements becomes excessive, the bimetal elements will become heated and will change in shape in accordance with the curves shown in Figures 3 and 4. The heating of the bimetals will cause the contacts 30 and 48 to separate and the circuit therebetween will be broken so that the contacts may reengage as the bimetals cool. The bimetal elements 44 and 46 are also responsive to ambient temperature changes and, thus, will protect the motor under conditions of high current or ambient temperatures or combinations thereof. Thus, the switch 20 is particularly adapted to be used as a motor protector in small electric motors such as are used in motor vehicles, to protect the motor in the event of either high ambient temperature conditions or high current conditions or combinations of the two.

While the embodiments of the present invention as herein disclosed constitute preferred forms, it is to be understood that other forms might be adopted.

What is claimed is as follows:

1. In a thermostatic device of the character described, the combination comprising; a support having a stationary contact portion, a temperature responsive member having a movable contact portion engageable with said stationary contact portion with increased pressure upon a decrease in temperature, and a temperature responsive means having a double curve temperature-deflection characteristic arranged to decrease the pressure engagement between said portions only when the temperature of said means is less than a predetermined value.

2. In a thermostatic device of the character described, the combination comprising; a support having a stationary contact portion, a temperature responsive bimetallic member having a movable contact portion engageable with said stationary contact portion with increasing pressure between said portions when the temperature of said member decreases from a predetermined value, and a temperature responsive means having a double throw curve temperature-deflection characteristic engaging said member and arranged to decrease the pressure engagement between said portions only when the temperature of said means is less than said predetermined value.

3. In a thermostatic device of the character described, the combination comprising; a support having a stationary contact portion, a temperature responsive bimetallic member carried by said support and having a contact portion arranged to engage said stationary contact portion with increased pressure between said portions with a decrease in temperature of said member from a predetermined temperature, and a temperature responsive bimetallic means carried by said support and having a double curve characteristic to decrease the pressure engagement between said portions only when the temperature of said means is less than said predetermined value.

4. In a thermostatic device of the character described, the combination comprising a support having a stationary contact portion, an elongate temperature responsive bimetallic member having a single curve characteristic and having one end carried by said support and having a contact portion on another end arranged to engage said stationary contact portion with an increased pressure between the portions as the temperature of said member is decreased from a predetermined temperature value, and an elongate temperature responsive bimetallic element having one end carried fixed relative to said support and another end in pressure engagement with said member, said element having a double curve characteristic so the pressure between said portions is substantially constant when the temperature of said element and member decreases below said predetermined value.

5. In a thermostatic device of the character described, the combination comprising; a support having a stationary contact portion, an elongate temperature responsive bimetallic element having a single curve temperature characteristic and a contact portion engageable with said stationary contact portion with increasing pressure between said portions as the temperature of said member decreases below a predetermined value, and a temperature responsive bimetallic element having a double curve characteristic for decreasing the pressure engagement between said portions only when the temperature of said double curve element is less than said predetermined value.

6. In a switch of the character described, the combination comprising; a temperature responsive bimetallic member having a deflection-temperature characteristic to cause a movable contact to engage a relatively stationary contact with increasing pressure as the temperature of said member is decreased, and a second temperature responsive bimetallic member stressed and cooperating with said first member to cause the pressure between said contacts to be increased at a predetermined temperature and having a double curve deflection-temperature characteristic to compensate for the increased pressure exerted in said contacts only when said second member has a temperature less than said predetermined temperature.

7. In a switch of the character described, the combination comprising; a temperature responsive bimetallic member having a deflection-temperature characteristic for causing a movable contact to engage a relatively stationary contact with a progressively increasing pressure as the temperature of said member is progressively decreased, and a second temperature responsive bimetallic member normally stressed and in engagement with said first member for causing the pressure between said contacts to be increased at a predetermined temperature and having a double curve deflection-temperature characteristic for progressively compensating for the increased pressure exerted on said contacts by said first member only when the temperature of said second member is progressively decreased from said predetermined value.

References Cited in the file of this patent

UNITED STATES PATENTS

| | | |
|---|---|---|
| 1,731,822 | Mau | Oct. 15, 1929 |
| 2,139,921 | Weinhardt | Dec. 13, 1938 |
| 2,632,824 | Malone | Mar. 24, 1953 |